2,932,637

NEW ACID AMIDE AZO-PIGMENT-DYESTUFFS

Rudolf Mory, Dornach, Switzerland, assignor to Ciba Limited, Basel, Switzerland, a firm of Switzerland No Drawing. Application January 2, 1959
Serial No. 784,434

Claims priority, application Switzerland
September 7, 1956

9 Claims. (Cl. 260—188)

This is a continuation-in-part of my co-pending application Ser. No. 680,414, filed August 26, 1957 (abandoned since the filing of the present application).

The present invention provides new azo-pigment-dyestuffs which are free from water-solubilizing groups and correspond to the general formula

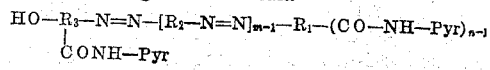

in which $R_1$ represents an aromatic radical of the benzene or naphthalene series, $R_2$ represents an aromatic radical of the benzene or naphthalene series in which the azogroups are in the 1:4-positions with respect to each other, $R_3$ represents a naphthalene radical in which the azo-, hydroxyl and CONH-Pyr groups occupy the 1-, 2- and 3-positions respectively, $m$ and $n$ are 1 or 2 and Pyr stands for a pyrene radical.

The invention also provides a process for the manufacture of the above pigments, which are carboxylic acid amide derivatives of azo-dyestuffs, wherein a carboxylic acid halide which is free from water-solubilizing groups and corresponds to the formula

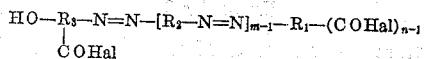

in which $R_1$ and $R_2$ have the meanings given above, $R_3$ represents a naphthalene radical in which the azo-, hydroxyl- and carboxylic acid halide groups occupy the 1-, 2- and 3-positions respectively and $m$ and $n$ are 1 or 2, is reacted with a monoamino-pyrene which is free from water-solubilizing groups.

The starting materials used in the above process are free from water-solubilizing groups such as sulfonic acid groups, sulfonamide, methylsulfone and carboxylic acid groups. As the aminopyrene starting materials there may be mentioned, more especially, 3-aminopyrene. There also come into consideration, however, aminopyrenes which are substituted in the pyrene nucleus, for example, which contain an acylamino group.

The azo-carboxylic acids, from which the acid halides of the above formula are manufactured, may be obtained (a) by coupling an aromatic amine of the formula

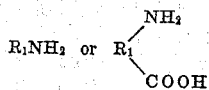

$R_1NH_2$ or 

with a middle component of the formula $R_2NH_2$ in which $R_1$ and $R_2$ have the meanings given above, diazotizing the aminomonoazo-dyestuff so obtained and coupling with a 2:3-hydroxynaphthoic acid, or (b) by coupling a compound of the formula

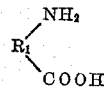

with a 2:3-hydroxynaphthoic acid.

As amines of the formula $R_1NH_2$ there come into consideration water-solubilizing group-free-amines of the naphthalene series, as for example, 1-amino-naphthalene, but especially amino-benzenes. As examples there may be mentioned: unsubstituted aniline, nuclear halogenated anilines as, for example, ortho-, para- or meta-chloraniline, 2:5-dichloraniline, 3:4:5-trichloraniline, para-bromaniline, nitro-anilines such as ortho-, para- or meta-nitroaniline, alkoxy-anilines as, for example, ortho- and para-methoxy-aniline, nuclear alkylated anilines such as toluidines, meta-xylidine, halogeno-alkylanilines such as 3-trifluoromethyl aniline or 3:5-di-(tri-fluoro-methyl-aniline, phenyl anilines containing a functionally converted carboxylic group, for example, a carboxylic acid ester group, cyano-group or carboxylic acid-phenyl amide group. As compounds containing such groups the following representatives may be mentioned: aniline-3-carboxylic acid methyl ester, aniline-3:5-dicarboxylic acid-dimethyl ester, 3-cyanoaniline, 3- or 4-aniline carboxylic acid anilide. Furthermore, there come into consideration anilines containing different substitutents as, for example, 2-chloro-5-methyl-aniline, 4-chloro-2-methylaniline, 2-methyl-5-chloroaniline, 2-chloro-4-nitroaniline, 2-chloro-5-trifluoromethylaniline, 2-nitro-4-chloroaniline, 4-chloro-2-methoxyaniline, 2-chloro-4-methoxyaniline, 4-chloro-2-methoxy-5-methylaniline, 2-nitro-4-methyl aniline, 4- or 5-nitro-2-methylaniline, 4-nitro-2-methoxyaniline and 4-chloro-2:5-dimethoxyaniline.

As carboxylic acid group-containing amines of the formula $$R_1 \begin{matrix} NH_2 \\ COOH \end{matrix}$$

there may be mentioned:

1-amino-2-chlorobenzene-5-carboxylic acid,
1-amino-4-chlorobenzene-5-carboxylic acid,
1-amino-2-nitrobenzene-4-carboxylic acid,
1-amino-4-bromobenzene-5-carboxylic acid,
1-amino-2-methoxybenzene-5-carboxylic acid,
1-amino-2-phenoxybenzene-5-carboxylic acid,
(4'-aminobenzoyl)-aminobenzene-4-carboxylic acid,
4-aminodiphenyl-4'-carboxylic acid,
1-aminonaphthalene-5- or 8-carboxylic acid.

As middle components of the formula $R_2NH_2$ there come into consideration water solubilizing group-free-amines of the benzene or naphthalene series which couple in the para-position to the amino group, for example, 1-aminonaphthalene, 1-amino-8-chloronaphthalene, but above all anilines, as for example aniline, halogeno-anilines, as for example 2-chloroaniline, alkoxy-anilines, as for example, 2-methoxy- or 2-ethoxy-aniline, 2:5-dimethoxy-aniline or 2:5-diethoxy-aniline, nuclear alkylated anilines, as for example, 2-methoxy-5-methyl-anilines, 2-chloro-5-methyl aniline or 2-chloro-5-methoxy-aniline.

As final coupling components there are used 2:3-hydroxynaphthoic-acids, which, if desired, may be substituted in the benzene ring which is free from the carboxylic acid group, for example, by a halogen atom or an alkoxy- or alkyl- group. Advantageously there is used, however, as a result of its easy accessibility, the unsubstituted 2:3-hydroxynaphthoic acid.

The azo-carboxylic acids are treated with agents which enable carboxylic acids to be converted into their halides, for example, the chloride or bromide, especially with phosphorus halides such as phosphorus pentabromide or phosphorus trichloride or phosphorus pentachloride, phosphorusoxyhalides, and especially with thionyl chloride.

The treatment with such acid-halogenating agents is advantageously carried out in inert organic solvents such as chlorobenzene, as for example, mono- or dichlorobenzene, toluene, xylene or nitrobenzene.

In the preparation of the carboxylic acid halides it is advantageous if the azo-compounds which are obtained in an aqueous medium are first dried by boiling in an organic solvent which forms an azeotrope with water to free them from water. This azeotropic drying can, if desired, be carried out immediately before the treatment with the acid halogenating agents.

The products of the invention are valuable, new blue to Bordeaux-colored pigments which are distinguished by an especially good color-strength and are particularly suitable for the coloring of polyvinyl compounds, for example, by rolling them into polyvinyl foils, and are also distinguished by especially good resistance to light and to migration and also resistance to temperature and to solvents.

They are also valuable for the so-called pigment printing, that is to say, for printing methods which depend upon fixing the pigment by means of a suitable adhesive agent, such as casein, heat-hardenable synthetic resins, especially urea- or melamine-formaldehyde condensation products, polyvinyl chloride or polyvinyl acetate solutions or emulsions or other emulsions (for example oil-in-water or water-in-oil emulsions), to a substratum, especially to textile fibers, but also to flat structures, such as paper (for example, wall-paper) or to glass-fiber fabrics. The pigments of the invention can also be used for other purposes, for example for the coloring of artificial silk and viscose or cellulose ethers and esters or super-polyamides or super-polyurethanes by incorporation in finely divided form in the spinning composition, as well as for the manufacture of colored lacquers or lacquer-formers, solutions and products from acetylcellulose, nitro-cellulose, natural or synthetic resins, such as polymerization- or condensation resins, for example, aminoplasts, phenoplasts, polystyrene, polyethylene, polyacrylate, rubber, casein, silicon and silicone resins. Furthermore they may be advantageously used in the manufacture of colored pencils, cosmetic preparations or laminates.

Preparations which contain the pigments in finely divided form can be obtained in known manner by intensive mechanical treatment, for example, by passing between rollers or by means of suitable kneading apparatus. For this there is chosen for the dispersion and the intensive working a suitable medium according to the desired purpose in view, for example, for the manufacture of aqueous dispersible preparations there may be used sulfite waste liquor or naphthylmethane-disulfonic acid salts, and for the manufacture of acetate-artificial silk spinning preparations there is used acetyl cellulose mixed with a small quantity of solvent.

In consequence of the especially good physical form in which the products of the invention are generally obtained, and in view of their chemical inertness and good resistance to temperature, they can normally be readily distributed in the compositions or preparations of the mentioned kind and advantageously in a short period of time, since these compositions or preparations do not yet occupy their definite form. The required shaping methods, such as spinning, pressure moulding, hardening, casting or sticking or other methods can be carried out directly in the presence of the above pigments without hindrance to eventual chemical reactions of the substrata, such as further polymerization or condensation.

The following examples illustrate the invention, the parts being by weight unless otherwise stated:

Example 1

A mixture of 50.9 parts of the disazo-dyestuff carboxylic acid, which had been obtained by coupling diazotized 1-amino-2:5-dichlorobenzene with 1-amino-5-methyl-2-methoxybenzene, diazotizing again the amino-monoazo-dyestuff so obtained and coupling with 2:3-hydroxynaphthoic acid, and 500 parts by volume of chlorobenzene was dehydrated completely by distillation with 50 parts by volume of the organic solvent. To the cold mixture there were added 0.8 part by volume of dimethyl formamide and 14.2 parts by volume of thionyl chloride and the mixture was heated for an hour at 130 to 140° C. The mixture was then allowed to cool and the dyestuff chloride which separated in coarse crystalline needles was washed with a quantity of cold chloro-benzene, then with petroleum ether and dried in vacuo at room temperature. The chloride obtained was a dark crystalline powder having a bronze lustre surface.

A mixture of 52.75 parts of this chloride, 22.8 parts of 3-aminopyrene, 1750 parts by volume of chlorobenzene and 8 parts by volume of pyridine were heated for 16 hours at 130–140° C. The pigment separating as tiny, curved needles was filtered hot and purified by washing with boiling chlorobenzene, boiling alcohol and boiling water. After drying in vacuo at 50 to 60° C. the pigment was obtained as a violet, soft granular powder. It was completely insoluble in boiling chlorobenzene and boiling dimethyl formamide, and colored polyvinyl chloride a violet tint of very good color strength and having very good resistance to migration and light.

By using 1-amino-2:5-dimethylbenzene instead of 1-amino-5-methyl-2-methoxybenzene as middle component of the starting dyestuffs, there can be obtained in the above manner a pigment coloring polyvinyl chloride foils red-violet and which has good resistance to migration and to light.

By using 1-amino-2:5-diethoxybenzene as middle component of the starting dyestuffs, there can be obtained a pigment which colors polyvinyl chloride foils a blue tint and which also has very good properties.

By using 3-acetylamino-8-amino-pyrene instead of 3-aminopyrene in the second paragraph there is obtained a pigment coloring polyvinyl chloride foils somewhat more reddish violet shades.

Examples 2

A mixture of 15.1 parts of the disazo-dyestuff-dicarboxylic acid which is obtained by coupling diazotized 1-amino-2-chlorobenzene-5-carboxylic acid with 1-amino-2:5-dimethylbenzene, diazotizing again the aminomonoazo-dyestuff so obtained and coupling with 2:3-hydroxynaphthoic acid, 350 parts by volume of chlorobenzene, 2.4 parts by volume of dimethyl-formamide and 14.2 parts by volume of thionyl chloride was heated for 15 minutes at 130–140° C. After cooling the dyestuff chloride consisting of small clusters of violet needles was separated by filtration, washed with a little cold chlorobenzene, then with petroleum ether and was dried in vacuo at room temperature.

15.8 parts of this chloride in admixture with 14.3 parts of 3-aminopyrene, 5 parts by volume of pyridine and 400 parts by volume of chlorobenzene were heated for 16 hours at 130–140° C. The difficultly-soluble pigment which separated was filtered hot and washed with boiling chlorobenzene, boiling alcohol and boiling water. The dried product was a violet, soft granular powder which was completely insoluble in boiling chlorobenzene and boiling dimethyl formamide. This pigment colored polyvinyl chloride a red-violet tint of very good color strength and having very good resistance to migration and to light.

The following table shows further pigments which were obtained by the method given in the above example, by coupling the diazo-compounds of each of the amines mentioned in column 1 with the corresponding middle-component shown in column 2, diazotizing the aminoazo-dyestuff so obtained, coupling with 2:3-hydroxynaphthoic acid and reacting the acid chloride of the disazo-dyestuff-dicarboxylic acid so obtained with 3- aminopyrene. Column 3 shows the color tint which is obtained by coloring polyvinyl chloride with the pigment.

|   | I | II | III |
|---|---|----|-----|
| 1 | 1-Amino-2-chlorobenzene-5-carboxylic acid. | 1-Amino-5-methyl-2-methoxybenzene. | violet. |
| 2 | 1-Amino-4-chlorobenzene-5-carboxylic acid. | ......do...................... | Do. |
| 3 | 1-Amino-2-nitrobenzene-4-carboxylic acid. | ......do...................... | Do. |
| 4 | 1-Amino-2-chlorobenzene-5-carboxylic acid. | 1-Amino-2:5-dimethoxybenzene. | blue. |
| 5 | ......do...................... | 1-Amino-2:5-diethoxybenzene. | greenish-blue. |
| 6 | ......do...................... | 1-Aminonaphthalene. | grey-blue. |
| 7 | 4-Aminobenzoic acid. | 1-Amino-5-methyl-2-methoxybenzene. | brownish-red. |
| 8 | 1-Aminobenzene-3:5-dicarboxylic acid. | ......do...................... | violet. |
| 9 | 1-Amino-5-trifluoromethyl-2-chlorobenzene. | ......do...................... | Do. |

*Example 3*

36.6 parts of the dyestuff obtained by coupling diazotized 3-amino-4-methoxy-benzoic acid with 2:3-hydroxynaphthoic acid are mixed with 1000 parts by volume of chlorobenzene, 1.6 parts by volume of dimethylformamide and 19.9 parts by volume of thionyl chloride and heated for one hour at 130–140° C. with stirring. After cooling the reaction mixture, the dicarboxylic acid chloride of the dyestuff, consisting of thin yellow-red needles, is isolated by filtration and dried in vacuo at 50 to 60° C.

36.3 parts of the above chloride are heated in 1000 parts by volume of ortho-dichloro-benzene at 100° C. with stirring. A hot solution (about 100° C.) of 43 parts of 3-aminopyrene and 14.4 parts by volume of pyridine in 300 parts by volume of ortho-dichlorobenzene is added to the mixture. The whole is stirred for 20 hours at 140–150° C. The pigment formed is filtered at 120° C., washed with hot ortho-dichlorobenzene, hot alcohol and hot water and dried in vacuo at 50 to 60° C. The pigment dyestuff is a blue-red powder which is very sparingly soluble in organic solvents and colors polyvinyl chloride foils ruby red tints which are fast to light and migration.

The product obtained has the following formula

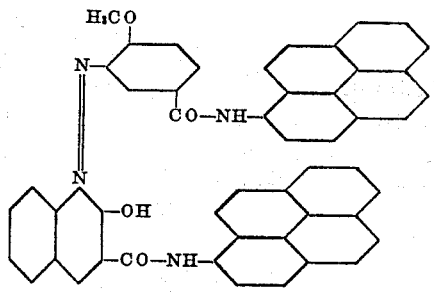

When 6-bromo-2:3-hydroxynaphthoic acid is used instead of 2:3-hydroxynaphthoic acid, a pigment is obtained which colors polyvinyl chloride somewhat more bluish tints of similarly good fastness to light and migration.

*Example 4*

65 parts of polyvinyl chloride, 35 parts of dioctyl phthalate and 0.2 part of the pigment obtained according to Example 1 were mixed together and then rolled on a two-roll-calendar mill for 7 minutes at 140°. There was obtained a violet colored foil having very good resistance to light and migration.

What is claimed is:

1. An azo-pigment-dyestuff which is free from water-solubilizing groups and which corresponds to the formula

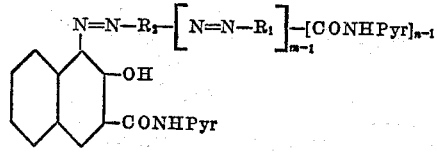

in which $R_1$ represents a benzene radical, $R_2$ represents a carbocyclic aromatic radical having at most 10 nuclear carbon atoms in which the azo-groups are in 1:4-position with respect to each other, Pyr stands for a 3-pyrene radical, and $m$ and $n$ are whole numbers of at most 2 and $n+m$ is at least 3.

2. An azo-pigment-dyestuff which is free from water-solubilizing groups and which corresponds to the formula

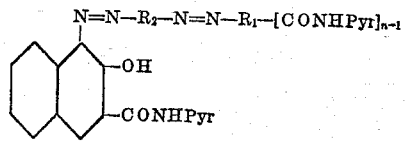

in which $R_1$ represents a benzene radical, $R_2$ represents a carbocyclic aromatic radical having at most 10 nuclear carbon atoms in which the azo-groups are in 1:4-position with respect to each other, Pyr stands for the 3-pyrene-radical and $n$ is a whole number of at most 2.

3. An azo-pigment dyestuff which is free from water-solubilizing groups and which corresponds to the formula

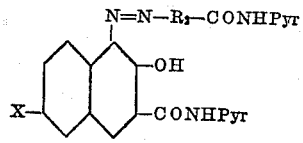

in which $R_2$ represents a benzene radical, Pyr stands for the 3-pyrene-radical, X for a member selected from the group consisting of a hydrogen and a bromine atom.

4. The azo-pigment dyestuff of the formula

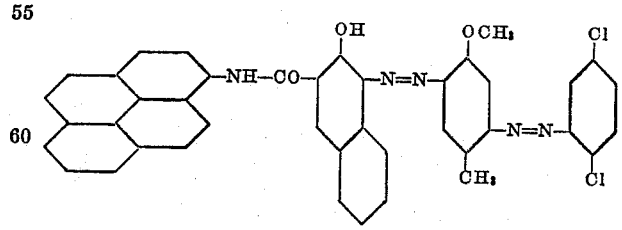

5. The azo-pigment dyestuff of the formula

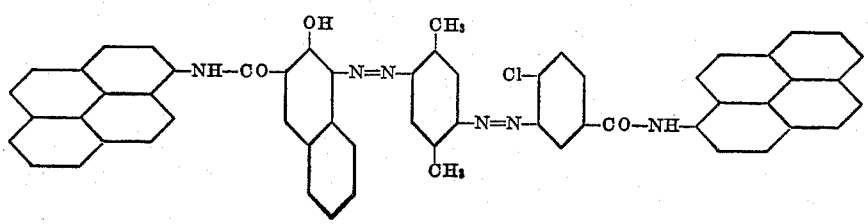

6. The azo-pigment dyestuff of the formula
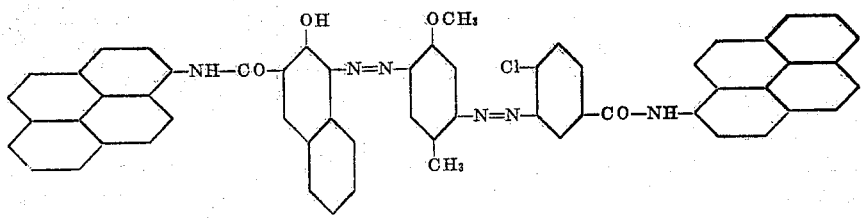
7. The azo-pigment dyestuff of the formula
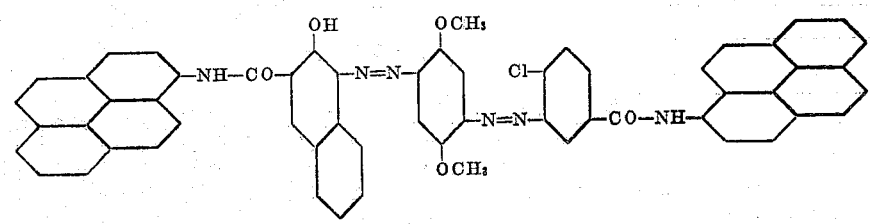
8. The azo-pigment dyestuff of the formula
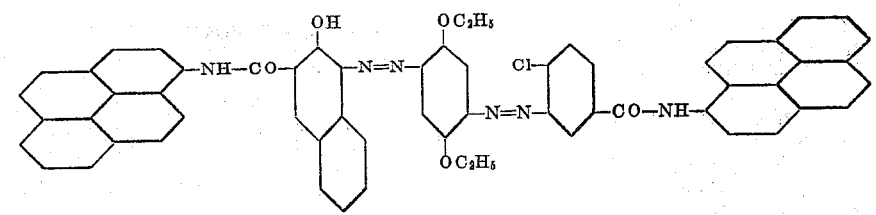
9. The azo-pigment dyestuff of the formula
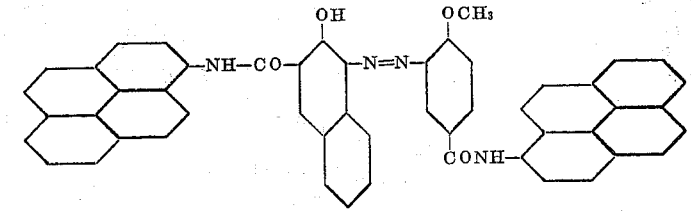
References Cited in the file of this patent
UNITED STATES PATENTS
| | | |
|---|---|---|
| 2,163,074 | Thomas et al. | Jan. 20, 1939 |
| 2,170,372 | Kern | Aug. 22, 1939 |